Aug. 25, 1931.   G. B. PICKOP   1,820,320
VIBRATOR
Filed April 4, 1930

Inventor
George B. Pickop
By Rockwell & Bartholow
Attorneys

Patented Aug. 25, 1931

1,820,320

UNITED STATES PATENT OFFICE

GEORGE B. PICKOP, OF BRANFORD, CONNECTICUT, ASSIGNOR TO MALLEABLE IRON FITTINGS COMPANY, OF BRANFORD, CONNECTICUT

VIBRATOR

Application filed April 4, 1930. Serial No. 441,595.

This invention relates to a vibrator, and more especially to a vibrator of the reciprocating piston type.

It is, in general, an object of the invention to provide a vibrator which may be effectively and efficiently connected or fastened to a part to be vibrated.

In a more specific aspect, it is an object of the invention to provide a vibrator having a head provided with a flat surface of relatively great area which may be clamped or rigidly secured against a part to be vibrated.

Another object of the invention is to provide an arrangement for mounting a vibrator on a part to be vibrated by means of bolts or the like, wherein there is no tendency for the bolts to sheer off during the ordinary operation of the vibrator.

To these and other ends, the invention consists in the novel features and combinations of parts to be hereinafter described and claimed.

Figure 1:
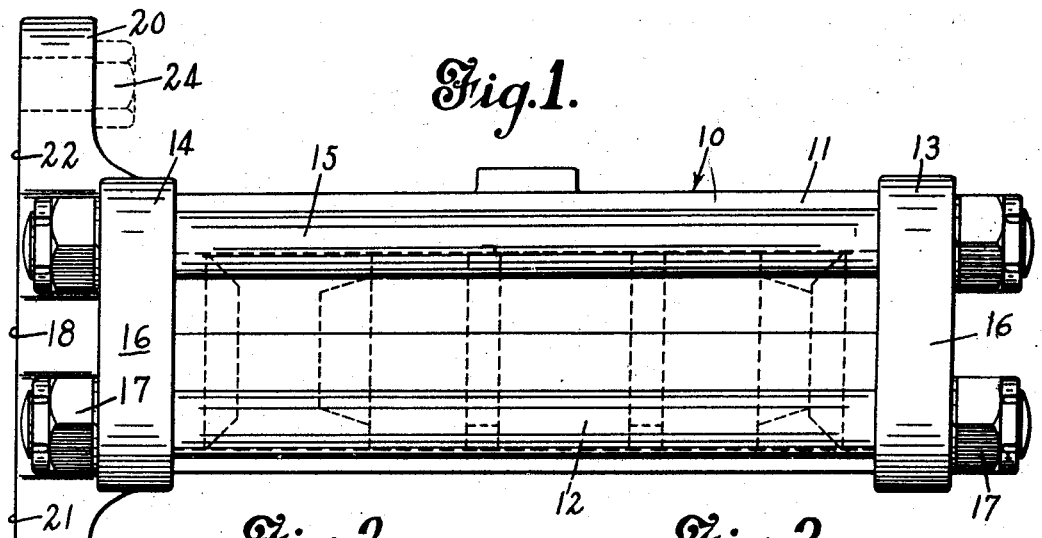
Fig. 1 is a plan view of a vibrator according to my invention.
Figure 2:
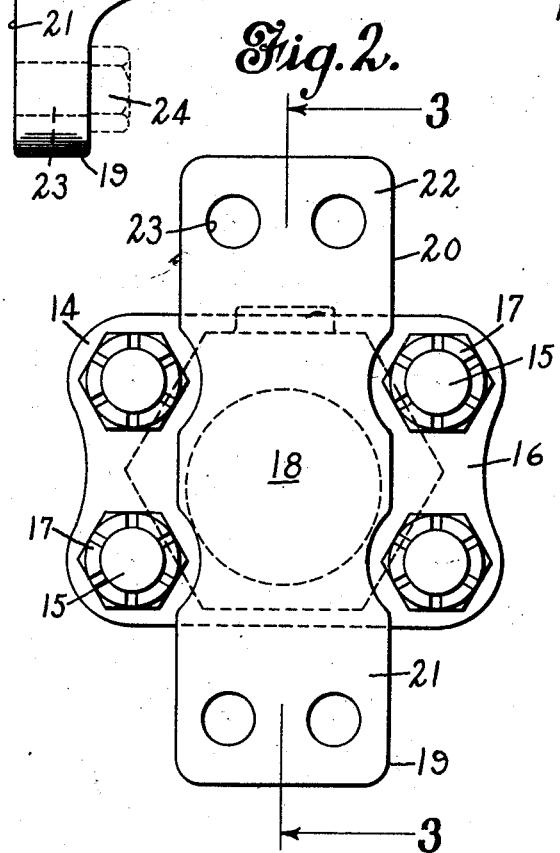
Fig. 2 is a view of the left-hand end of the same, as shown in Fig. 1.
Figure 3:
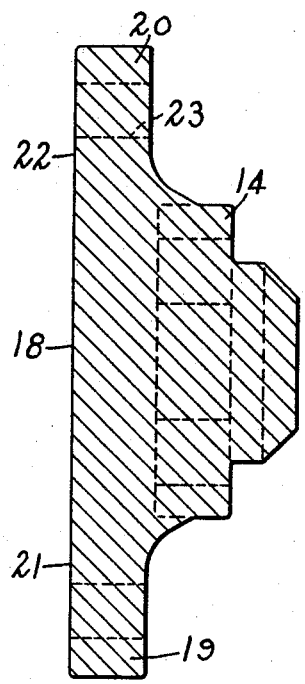
Fig. 3 is a cross-sectional view along line 3—3 of Fig. 2.

Referring now to the drawings in which I have illustrated my invention by showing a preferred embodiment of the same, the reference numeral 10 indicates, in general, the improved vibrator which comprises, generally speaking, a cylinder 11, a vibratory ram 12, and heads 13 and 14, which are secured to cylinder 11 and to one another by means of rods 15.

I do not show the details of the vibratory ram, cylinder or the valve arrangement for controlling the movement of a ram, since these form no part of the present invention, but may take any usual form, for example, that shown in my prior Patent No. 1,336,921 of April 13, 1920.

The heads 13 and 14 are provided with laterally extending arms 16, which are apertured for the reception of bolts or rods 15, rods 15 being threaded at their ends for the reception of nuts 17, which bear against the outer faces of arms 16 and serve to draw the heads 13 and 14 against the cylinder 11 and to transmit the blows of ram 12 from one head to the other. Head 14 terminates in a flat face 18, which bears against the articles to be vibrated, head 14 being provided with a pair of lugs 19 and 20, which extend laterally on opposite sides of the head between arms 16, and are provided with relatively wide flat faces 21 and 22, which are in the same plane with and form a continuation of face 18, lugs 19 and 20 being apertured at 23 so that they may be clamped against an article to be vibrated by means of bolts or screws 24 inserted through the apertures or openings 23. Faces 18, 21 and 22 are spaced axially beyond the ends of rods 15 so that the latter are out of contact with the article to be vibrated when the vibrator is secured thereto. In operation, the head 14 of the improved vibrator may be rigidly attached to a molding-board, or any other article to be vibrated, by means of bolts or screws 24 passing through the openings 23, the relatively great area of the faces 18, 21 and 22 insuring that the vibrations will be readily and efficiently communicated to the article, the spacing of the openings 23 at the opposite sides of the head 14 insuring that the bolts or screws will not become readily loosened.

While I have shown and described a preferred embodiment of my invention, it will be understood that it is not to be limited to all of the details shown, but is capable of modification and variation within the spirit of the invention and the scope of the appended claim.

What I claim is:

In a vibrator, a cylinder, a vibratory ram in said cylinder having vibratory movement in an axial direction therein, heads at each end of the cylinder, each of said heads being provided with a pair of radially opposite arms extending laterally beyond the cylinder, means passing through said arms for securing the heads to the cylinder, one of said heads being provided with laterally extending lugs disposed substantially at right angles to said arms, and a portion between said lugs which with the said lugs forms a flat surface at right angles to the axis of the vibrator, said lugs having axially directed openings therein for the reception of fastening members, and the plane of said flat surface being spaced outwardly from the radially opposite arms on the head whereby it lies beyond the ends of the securing means passing through said arms.

In witness whereof, I have hereunto set my hand this 2nd day of April, 1930.

GEORGE B. PICKOP.